May 29, 1956 J. H. NELLIS 2,748,244
DOMESTIC APPLIANCE
Filed May 16, 1951 3 Sheets-Sheet 2
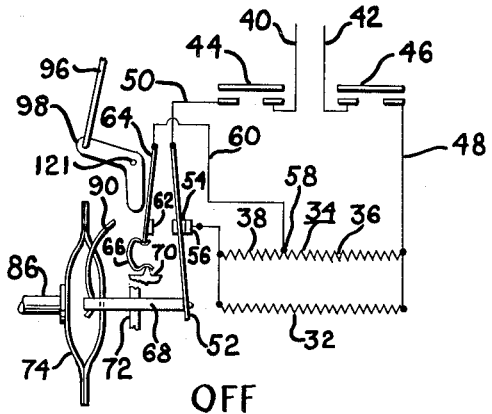
Fig. 2 — OFF
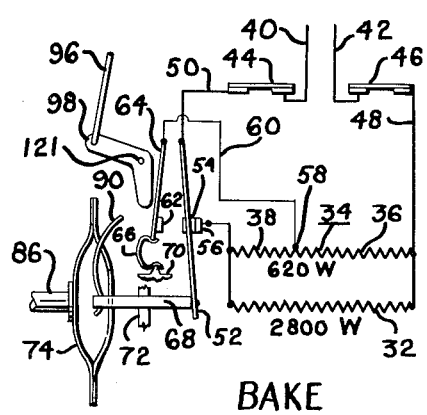
Fig. 3 — BAKE
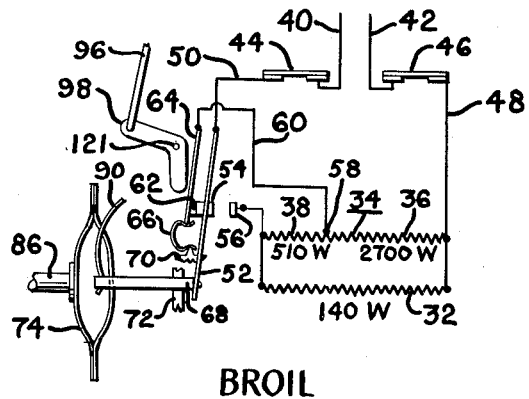
Fig. 4 — BROIL
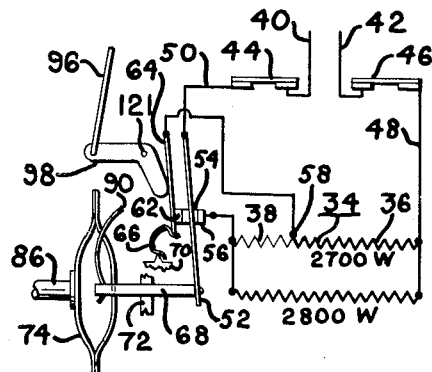
Fig. 5 — PRE-HEAT
INVENTOR.
James H. Nellis
BY Willits Hardman and John
attorneys

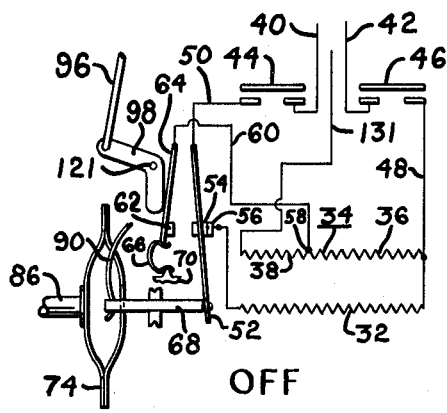
Fig. 6 OFF
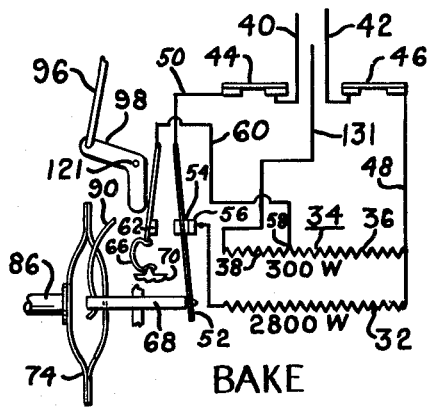
Fig. 7 BAKE
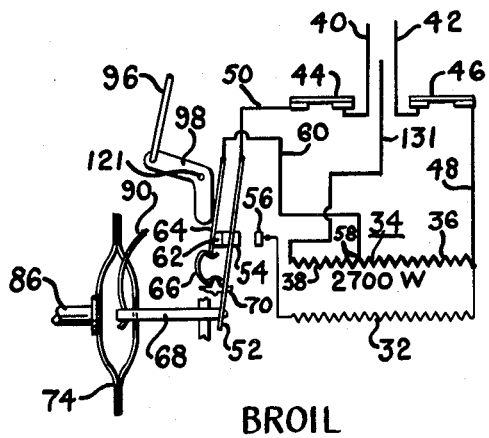
Fig. 8 BROIL
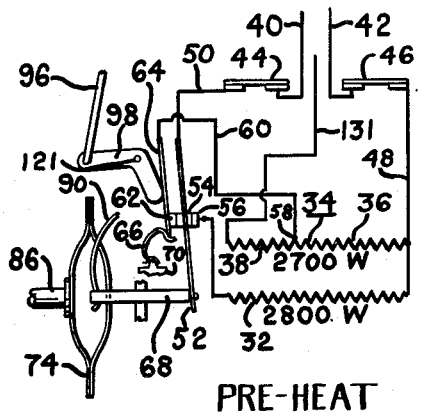
Fig. 9 PRE-HEAT

United States Patent Office 2,748,244
Patented May 29, 1956

2,748,244

DOMESTIC APPLIANCE

James H. Nellis, Dayton, Ohio, assignor to General Motors Corporation, Dayton, Ohio, a corporation of Delaware Application May 16, 1951, Serial No. 226,610

7 Claims. (Cl. 219—20)

This invention relates to a domestic appliance and more particularly to an electric control and heating support such as may be used to provide preheating, baking and broiling in an electric oven.

It is an object of my invention to provide a manually operable preheat-bake-broil control for electric ovens which, in simplicity and convenience, is equivalent or superior to an automatic control.

It is another object of my invention to provide a satisfactory simplified switch unit which is structurally separate from and functionally independent of the thermostat of an electric oven for providing selective preheat and bake and broil circuits.

It is another object of my invention to provide a preheat-bake-broil control for electric ovens which, except for the selective manual initiation of preheat, is satisfactorily controlled entirely by the necessary opening and closing of the oven door in normal baking and broiling operations.

To attain these objects I have provided an unusual double throw switch mechanism which is operated to and from the bake and broil circuit arrangements by a push rod actuated by the closing and opening of the oven door. A further feature of this switch mechanism is an optional manually operable preheat control by which one of the normally stationary contacts of the double throw switch is placed in electric connection, both with the double throw contact and the other normally stationary contact for providing maximum heat out-put for preheat purposes. The opening of the oven door for the purpose of placing food in the oven will change the circuit first from the preheat circuit to the broil circuit and then when the oven door is reclosed, will place the oven circuit in the bake arrangement. Since broiling is done with the oven door partially open, the broil circuit arrangement is inherently attained without any thought or manipulation by the cook merely by the normal partly open position of the door in broiling.

Two oven circuit arrangements are shown in each of which an upper broil unit has an intermediate tap connected to the movable mounted normally stationary switch contact of a novel double throw switch mechanism. This upper unit has a second terminal connected either to the other stationary contact or to a neutral conductor. One terminal of the lower heating unit is connected to the stationary contact while the other terminals of both the upper broil and the lower unit are connected to a live supply conductor. The other live supply conductor is connected to the movable contact of the double throw switch.

Further objects and advantages of the present invention will be apparent from the following description, reference being had to the accompanying drawings, wherein a preferred form of the present invention is clearly shown.

In the drawings:

Fig. 2 is a diagrammatic view of my preheating control with a wiring diagram of one form of oven circuit with the thermostatic control contacts in the open position;

Fig. 3 is a diagrammatical view similar to Fig. 2 with the thermostat contacts and the double throw switch mechanism in the position for baking;

Fig. 4 is a view similar to Figs. 2 and 3 with the thermostat contacts and the double throw switch mechanism in the position for broiling;

Fig. 5 is a view similar to Figs. 2 and 4 with the thermostat contacts and the double throw mechanism in the preheat position;

Fig. 6 is a diagrammatic view of the double throw preheat bake, broil mechanism with a wiring diagram of a second form of an electric heating system for an oven with the thermostat in the off position;

Fig. 7 is a view similar to Fig. 6 with the preheat bake, broil control in the bake position;

Fig. 8 is a view similar to Figs. 6 and 7 with the preheat bake, broil control in the broil position; and Fig. 9 is a view similar to Figs. 6 and 8 with the preheat bake, broil control in the preheat position.

Figure 1:
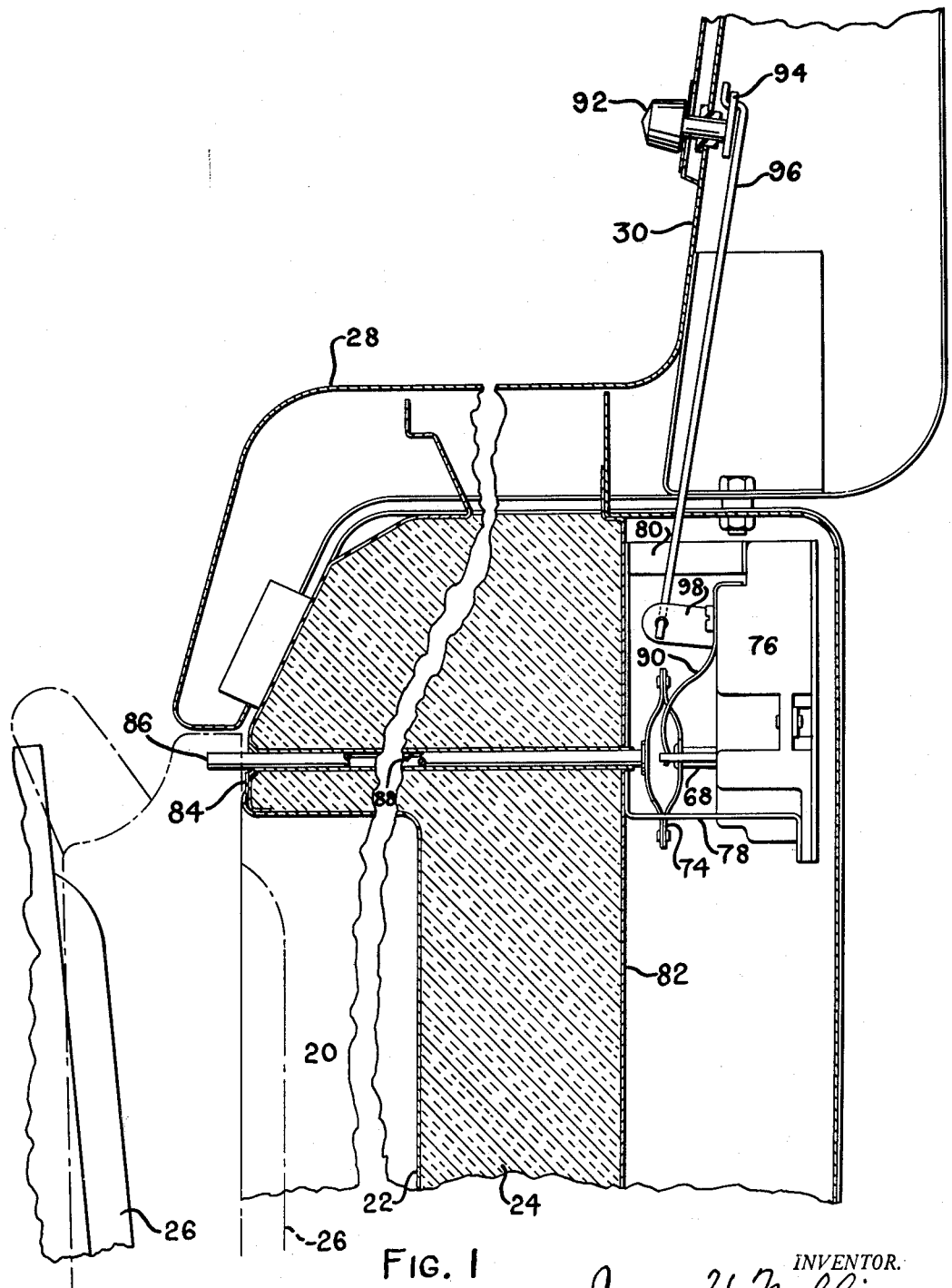
Fig. 1 is a fragmentary vertical sectional view of an electric oven embodying one form of my invention.

Referring now to the drawings and more particularly to Fig. 1 there is shown an electric oven 20 enclosed by an oven liner 22 and thermal insulation 24. The oven 20 is provided with an oven door 26 shown in full lines in the partially open broil position for broiling purposes, with the closed position of the door 26 being shown in dot-dash lines. Above the oven 20 there is provided a range top 28 having a back splash flange 30. The electric heating systems for the oven 20 are shown in Figs. 2 to 9 inclusive. In Figs. 2 to 5 there is shown an oven circuit including a bottom heating unit 32 having a rating of 2800 watts upon a 235 volt supply and an upper broil heating unit 34 having one section 36 with a normal rating of 2700 watts when connected to a 235 volt supply. The broil unit 34 has another section 38, which is only used in series with one of the other heating unit sections. The oven circuit shown in Figs. 2 to 5 is adapted to be connected to a 235 volt two wire supply circuit illustrated by the conductors 40 and 42.

The conductors 40 and 42 are connected by the contacts 44 and 46 of a double pole single throw thermostatic oven control switch which are adapted to connect and disconnect the oven heating units with the supply conductors 40 and 42. This oven thermostatic switch may be quite simple and need only to be responsive to the average temperature of the oven and be adjustable throughout a suitable range of temperature for baking purposes. An "off" position is provided for safely disconnecting the circuits from the power supply. The contact 46 is connected by the conductors 48 with one terminal of the lower heating unit 32 and one terminal of the upper heating unit 34. The thermostat contact 44 is connected by a conductor 50 with a double throw switch member 52 provided with the double throw switch contacts 54. The double throw switch contacts 54 are adapted to make engagement with a stationary contact 56 which is connected to the second terminal of both the lower and the upper heating units 32 and 34.

The upper heating unit 34 is provided with an intermediate tap 58 connected by a conductor 60 with a normally stationary contact 62 movable mounted upon a spring blade 64 to which the conductor 60 is physically connected. The spring blade 64 and the contact 62 are normally held in the position shown in Fig. 2 by a C-shaped toggle spring 66 which acts as a resilient detent. The C-shaped toggle spring 66 is wedged in between the stationary knife edge 70 which is located so that when the blade 64 is in the position shown it will be held in that position by the force and angularity of the toggle spring 66.

The movable double acting member 52 is connected to the inner end of a slide member 68 adapted to be slidably mounted in the sliding support 72 provided in the switch casing 76. The other end of the slide member 68 is connected to a full elliptic leaf spring member 74. The double throw mechanism including the contacts 54, 56 and 62, the blade members 52 and 64 and the toggle spring 66 are mounted in a casing 76 of insulating material connected by the brackets 78 and 80 to the rear wall 82 of the oven 20. Extending from the leaf spring member 74 to the upper door jamb portion 84 is a push rod 86 which is slidably mounted within a tube 88 extending from the door jamb portion 84 to the rear wall 82.

When the door 26 is in the closed position as shown by the dot-dash lines in Fig. 1, the push rod 86 will move the full elliptical leaf spring 74, the slide member 68 and the double throw member 52 and its contact 54 to the right to establish contact with the stationary contact 56 as shown in Figs. 2, 3 and 5. When the toggle mechanism is in the position shown in Figs. 2 and 3 and the door is closed, the oven support will be connected into the bake circuit arrangement whenever the thermostat is closed as shown in Fig. 3 with the upper broil position being energized 620 watts and the lower heating unit being energized 2800 watts upon a 235 volt, two wire supply.

Fastened to the insulating case or housing 76 is a cantilever type wishbone-shaped wire spring 90 having its free end connecting with the slide member 68 so as to yieldingly pull the slide member to the left as shown in the figure to keep the full elliptic spring 74 in contact with the adjacent end of the push rod 86.

This wishbone-shaped wire spring 90 is stronger than the spring force of the blades 52 and 64 and consequently when the oven door 26 is opened either to the broil position or to the fully open position, this spring 90 will move the slide member 68, the movable double throw contact member 52, as well as the full elliptic leaf spring member 86 to the left as shown in Fig. 4 to carry the double throw contact 54 into contact with the normally stationary contact 62 which is held in its extreme left position by its toggle spring 66. This broil position connects the supply conductor 40 through the contacts 44 to the conductor 50 and the double acting blade 52 with its double acting contact 54 in engagement with the contact 62 which connects through the blade 64 and conductor 60 to the tap 58. This broil position also places the section 36 of the upper heating unit across the 235 volt power supply, while the lower heating unit 32 is connected in series with the upper heating unit section 38 across the 235 volt power supply. This provides a total heat in-put of 3210 watts into the entire upper broil unit 34 and only 140 watts from the lower heating unit 32 thus providing excellent broiling conditions.

To provide a rapid preheat arrangement, the back splasher flange 30 is provided with a manually operable knob 92 which extends through flange 30 and is rotatably mounted in a bearing in the flange 30. Connected to the knob is an arm 94 provided with an aperture receiving the upper end of a link 96 the lower end of which is pivotally connected to the bellcrank lever 98 pivotally mounted upon the pin 121 within the insulating case 76. When the knob 92 is turned from the "bake" position shown in Fig. 1 to the preheat position, the link 96 is lowered to turn the bellcrank lever 98 in the counter-clockwise direction to the position shown in Fig. 5 so as to move the blade 64 and the contact 62 from the position shown in Figs. 2 to 4 to the position shown in Fig. 5 wherein the contacts 62, 54 and 56 are all in electrically connected contact. By this action, the toggle spring 66 has been moved across its dead-center position so that it will now serve as a detent to hold the three contacts together as shown in Fig. 5 and the knob 92 may be immediately released.

This position of the three contacts connects the circuit into the preheat arangement with the section 36 of the upper heating unit 34 and the bottom heating unit 32 both connected across the supply voltage of 235 volts. This provides a heat in-put of 2700 watts in the upper broil unit and 2800 watts in the lower unit for a combined total of 5500 watts in-put for quick preheating.

When the oven has come up to the pre-selected broiling or baking temperature as indicated by the opening of thermostat contacts 44 and 46, the door is necessarily opened to place food into the oven for either broiling or baking purposes. The opening of the oven door 26 will permit the wishbone-shaped spring 90 to move the rod 86, the full elliptical leaf spring 74, the slide member 68, the double throw contact member 52 and its contact 54 as well as a blade 64 and its contact 62 to the left to the position shown in Fig. 4 which incidentally discontinues the preheat arrangement and connects the oven circuit into the broil arrangement.

If broiling is desired, the door is left open approximately in the full line position shown in Fig. 1 after the food to be broiled is placed beneath the upper heating unit 34. Broiling is accomplished with the circuit shown in Fig. 4. If baking is desired, the door 26 is closed as the food to be baked is placed in the oven 20. The closing of the door 26 pushes the push rod 86 inwardly to carry the full elliptic leaf spring 74, the slide member 74, blade 52 and the contact 54 to the position shown in Fig. 3 which connects the circuits into the baking arrangement as shown in Fig. 3. The baking circuit arrangement will be continued as long as the door 26 remains closed, and is resumed whenever the door 26 is reclosed. The entire upper unit 34 is connected across the 235 volt power supply as shown in Fig. 3 to provide a top heat of 620 watts. The bottom unit is similarly connected to provide bottom heat of 2800 watts. These top and bottom heats provide suitable baking conditions. In this way baking and broiling and preheat circuit arrangements are provided by this simple switch which is simply and easily operated by the door operated rod 86 and the preheat knob 92. There is no structural connection between the preheat, bake, broil double throw switch arrangement and the simple double pole single throw thermostat.

In Figs. 6 to 9 this same control and simple oven thermostats are applied to a different oven heating circuit which has a third conductor 131 called the neutral conductor in addition to the live supply conductors 40 and 42 across which there is a supply voltage of 235 volts, this being the familiar Edison supply circuit system. This arrangement differs from the arrangement shown in Figs. 2 to 5 in that the neutral supply conductor 131 is connected to the one terminal of section 38 of the upper heating unit designated by the reference character 34. The remaining connections are the same. This heat circuit arrangement is of the type shown in the Fry Patent No. 2,388,839 issued November 13, 1945.

In this circuit, as in the circuit shown in Figs. 2 to 5, the preheating arrangement is set by the operation of the knob 92 which moves the link 96 to turn the bellcrank 98 in the counterclockwise direction to move the blade 64 to place on the contacts together as shown in Fig. 9. This places the section 36 of the upper heating unit 34 and the entire lower heating unit 32 directly across the 235 volt supply conductors 40 and 42. The section 38 of the upper heating unit is connected between the conductor 60 and the neutral supply conductor 131 to apply voltage of 117 volts. This provides a total in-put of 2700 watts for the upper heating unit and 2800 watts for the lower heating unit making a total of 5500 watts in-put.

When the door 26 is opened, to place food into the oven 20, the preheat arrangement is incidentially discontinued since the blades 52 and 64 are incidentially pulled to the left to the position shown in Fig. 8 by the slide member 68 under the force of the spring 90. This throws the blade 64 to the left across the dead-center position of the toggle arrangement provided by the C-shaped spring 66 so that the blade 64 will remain in this left position until the preheat button 92 is again operated. If broiling is desired, the door is placed in the normal partly open broil position shown in Fig. 1 after the food is properly placed beneath the upper heating unit thus incidentally keeping the controls in the broil arrangement shown in Fig. 8. In this circuit no heat is provided by the lower heating unit 33 in the broil position because the contacts 54 and 56 are separated. The upper heating unit 34 is connected in the same manner as in the preheat arrangement shown in Fig. 7 and continues to provide a total heating in-put of 2700 watts.

If it is desired to bake instead of broil, the food is placed into the oven and the door is necessarily fully reclosed thereby incidentally moving the blade 52 to the right or baking position separating the contacts 62 and 54 and placing the contact 54 in contact with the contact 56. In this position, as illustrated in Fig. 7, the lower heating unit 32 is connected across the 235 volt supply conductors 40 and 42 to provide an in-put of 2800 watts, while the entire upper heating unit 34 is connected in series across the supply conductors 42 and 131 providing a total heat in-put of 300 watts at 117 volts.

While certain voltages and heat in-puts are given as examples of suitable arrangements these may be varied to suit the specific conditions encountered.

While the form of embodiment of the present invention as herein disclosed constitutes a preferred form, it is to be understood that other forms might be adopted, as may come within the scope of the claims which follow.

What is claimed as as follows:

1. An electric oven including an upper broil electric heating unit, a bottom electric heating unit, a selective double throw switch means including a double throw switch member connected to one supply conductor, two normally stationary switch contact members normally located at opposite ends of the path of movement of said double throw switch member, a toggle mounting for one of said normally stationary contacts having one position holding said one contact at the one end of the path of movement of said double throw switch member and having a second position holding both said one contact and said switch member against the other normally stationary contact, one terminal of each of said heating units being connected to the second supply conductor, a second terminal of one of said heating units being connected to one of said normally stationary contacts, a second terminal of the second heating unit being connected to the other normally stationary contact.

2. An electric oven including a plurality of electric heating units, a selective double throw switch means including two normally stationary normally separated contacts and a movable contact mounted for movement between and into contact with the normally stationary contacts, a movable mounting for one of said normally stationary contacts providing sufficient movement for said one contact to allow it to be moved into contact with the movable contact when the movable contact is in engagement with the other stationary contact, a supply conductor connected to one terminal of two of said electric heating units, a second supply conductor connected to said movable contact, one of said two heating units having a second terminal connected to said other stationary contact, the other of said two heating units being provided with a terminal connected to a supply conductor other than the first mentioned supply conductor, said other heating unit being provided with an intermediate tap electrically connected with said movably mounted normally stationary contact.

3. An electric oven including an oven door, a heating means adjacent the top of the oven and a heating means adjacent the bottom of the oven, two supply connections, one terminal of each of said heating means being connected to one of said supply connections, a double throw switch means having its double throw contacts connected to the second of said supply connections and having two positions, a snap action switch means having a contact and having biasing means for yieldingly holding it in two alternate positions, a second switch contact located in contact with said double throw contacts in the first position of the double throw switch means, said second switch contact being connected to the second terminal of each of said heating means, the first position of said snap action switch means being located so as to place its contact in engagement with the double throw contacts when the double throw contacts are in contact with said second switch contact, the second position of said snap action switch means being located to place its contact in position to stop the movement of the double throw contacts in their movement away from the second contact to the second position of the double throw switch means, one of said heating means having a tap electrically connected to the contact of said snap action switch means, manual manipulating means for moving said snap action switch means from the second position to the first position for maximum heating, and interconnecting operating means between the oven door and the double throw switch means for moving the double throw switch means to its first position when the door is closed and to its second position when the door is opened to increase the heating rate of one heating means and to reduce the heating rate of the second heating means.

4. An electric oven including an oven door, electric heating means for said oven including selective switch means for selectively connecting the heating means into the bake and broil and preheat circuit arrangements, said switch means including a double throw switch means having double throw contacts and having two operating positions, a snap action switch means having a contact and having a biasing means for holding it into alternate operating positions, a second switch contact located in contact with said double throw contacts in the first operating position of the double throw switch means, the first operating position of said snap action switch means being located so as to place its contact in engagement with the double throw contacts when the double throw contacts are in contact with said second switch contact, the second operating position of said snap action switch means being located to place its contact in position to stop the movement of the double throw contacts in their movement away from the second contact to the second operating position of the double throw switch means, manual manipulating means for moving said snap action switch means from the second position to the first position for the preheat circuit arrangement, and interconnecting operating means between the oven door and the double throw switch means for moving the double throw switch means to its first operating position for the bake circuit arrangement when the door is closed and to its second operating position for the broil circuit arrangement when the door is opened.

5. An electric oven including an oven door, electric heating means for said oven including selective switch means for selectively connecting the heating means into bake and broil and preheat circuit arrangements, said switch means including a double throw switch element provided with oppositely facing switch contact means, a snap action switch contact provided with its own separate snap action mechanism cooperating with said contact means of the double throw switch element in one position of the double throw switch element, a second switch contact cooperating with said contact means of said double throw switch element in the second position of the double throw switch element, a push rod connected to said double throw switch element, spring means for biasing said double throw element to move its contact means into contact with said snap action contact for the broil circuit arrangement and for projecting said push rod into contact with said door in the direction of opening movement of said door to permit operation of the spring means when the door is opened, said push rod having sufficient length and projecting into the path of movement of the door a sufficient amount to cause it to be pushed by the door sufficiently to move the contacts of the double throw switch element into contact with said second contact for the bake circuit arrangement.

6. An electric oven including an oven door, electric heating means for said oven including selective switch means for selectively connecting the heating means into bake and broil and preheat circuit arrangements, said switch means including a double throw switch element provided with oppositely facing switch contact means, a snap action switch contact provided with its own separate snap action mechanism cooperating with said contact means of the double throw switch element in one position of the double throw switch element, a second switch contact cooperating with said contact means of said double throw switch element in the second position of the double throw switch element, a push rod connected to said double throw switch element, spring means for biasing said double throw switch element to move its contact means into contact with said snap action contact for the broil circuit arrangement and for projecting said push rod into contact with said door in the direction of opening movement of said door to permit operation of the spring means when the door is opened, said push rod having sufficient length and projecting into the path of movement of the door a sufficient amount to cause it to be pushed by the door sufficiently to move the contacts of the double throw switch element into contact with said second contact for the bake circuit arrangement, and means for moving both said snap action switch contact and said contact means of said double throw switch element into electrical connection with said second contact for the preheat circuit arrangement.

7. An electric oven including an oven door, electric heating means for said oven including selective switch means for selectively connecting the heating means into bake and broil and preheat circuit arrangements, said switch means including a double throw switch element provided with oppositely facing switch contact means, a snap action switch contact provided with its own separate snap action mechanism cooperating with said contact means of the double throw switch element in one position of the double throw switch element, a second switch contact cooperating with said contact means of said double throw switch element in the second position of the double throw switch element, an operating means between the door and said double throw switch element for moving said contact means of the double throw switch element into cooperation with said snap action switch contact when the door is open to connect the heating means in the broil circuit arrangement and for moving said contact means of said double throw switch element into contact with said second contact to connect the heating means in the bake circuit arrangement when the door is closed, and means for moving both said snap action switch contact and said contact means of the double throw switch element into electrical connection with said second contact to connect the heating means in the preheat circuit arrangement and for moving both the contacts of said double throw switch element and said snap action switch contact away from said second contact when the door is opened.

References Cited in the file of this patent

UNITED STATES PATENTS

| | | |
|---|---|---|
| 2,076,968 | Shaw | Apr. 13, 1937 |
| 2,218,778 | Weimer | Oct. 22, 1940 |
| 2,269,162 | Newell | Jan. 6, 1942 |
| 2,324,161 | Holmes | July 13, 1943 |
| 2,379,602 | Stichel | July 3, 1945 |
| 2,385,454 | Weber | Sept. 25, 1945 |
| 2,388,839 | Fry | Nov. 13, 1945 |
| 2,402,787 | Stickel | June 25, 1946 |
| 2,409,434 | Jacobs | Oct. 15, 1946 |
| 2,434,467 | McCormick | Jan. 13, 1948 |
| 2,496,889 | Pearce | Feb. 7, 1950 |
| 2,603,813 | Christensen | July 22, 1952 |
| 2,614,199 | Fallon | Oct. 14, 1952 |